Sept. 21, 1943.   E. D. WATERS   2,330,096
MARKER FOR AIRCRAFT LANDING STATIONS
Filed June 5, 1940   2 Sheets-Sheet 1
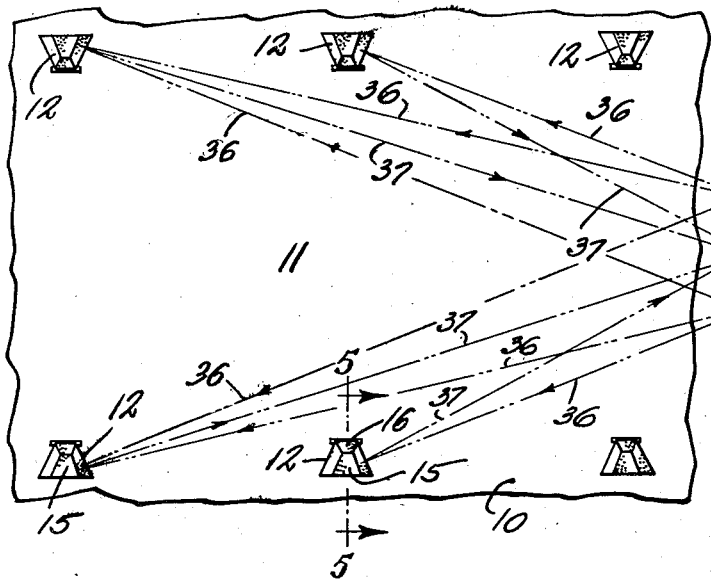
Fig. 1.
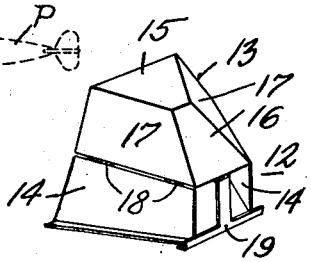
Fig. 2.
Fig. 4.
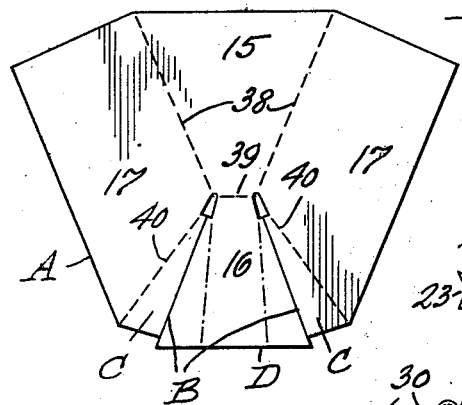
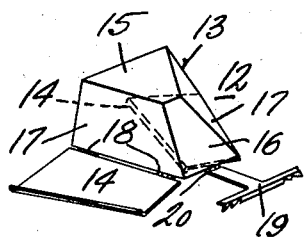
Fig. 3.
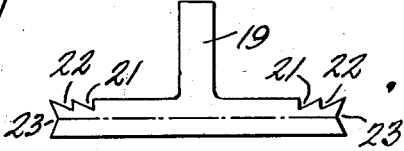
Fig. 3a.
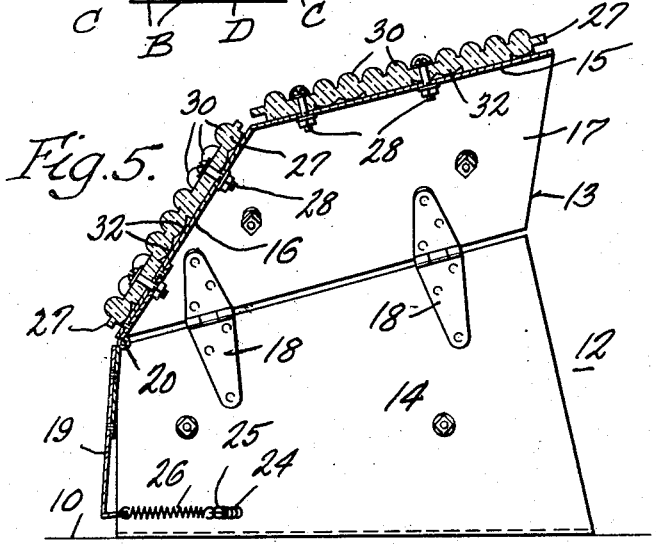
Fig. 5.
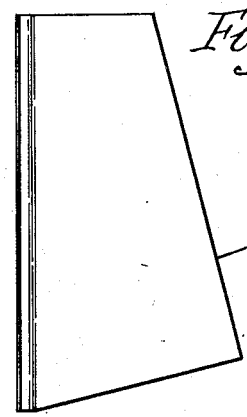
Fig. 3b.
INVENTOR
Eugene D. Waters.
BY
Parker, Prochnow & Farmer.
ATTORNEYS Sept. 21, 1943.     E. D. WATERS     2,330,096
MARKER FOR AIRCRAFT LANDING STATIONS
Filed June 5, 1940     2 Sheets-Sheet 2
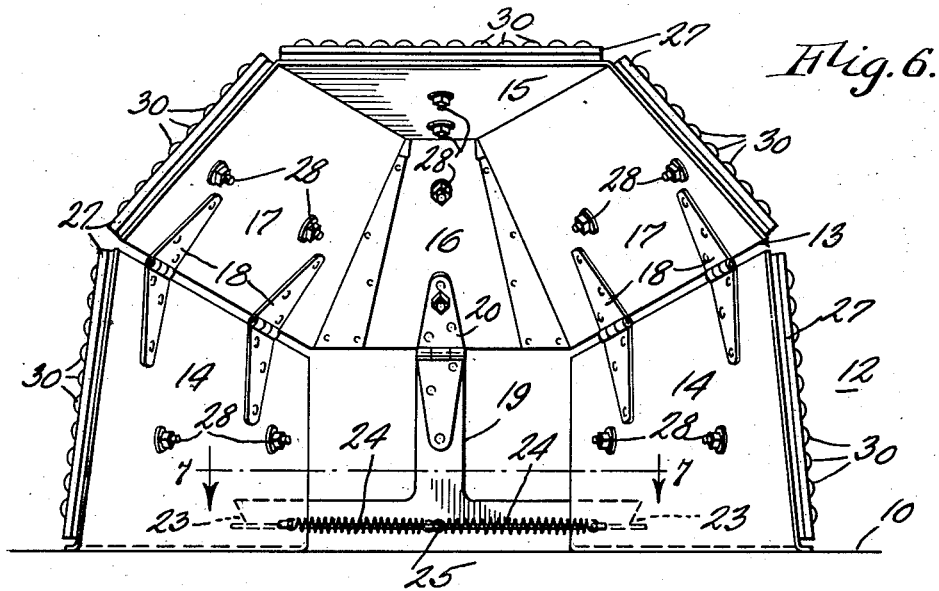
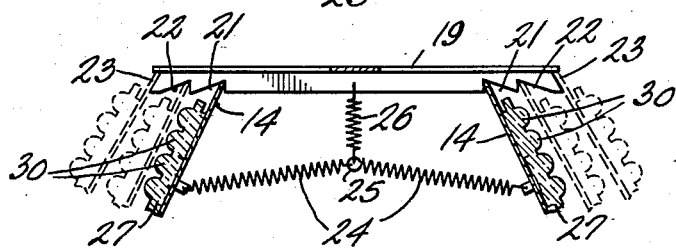
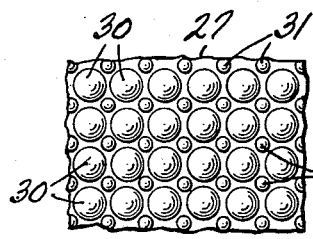
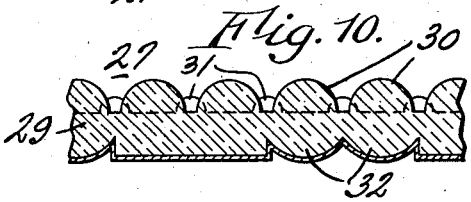
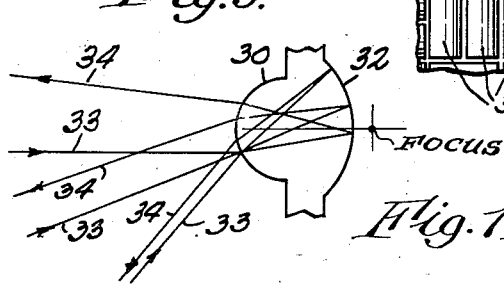
INVENTOR
Eugene D. Waters.
BY
Parker, Prochnow & Farmer.
ATTORNEYS Patented Sept. 21, 1943

2,330,096

UNITED STATES PATENT OFFICE 2,330,096

MARKER FOR AIRCRAFT LANDING STATIONS

Eugene D. Waters, Buffalo, N. Y., assignor, by direct and mesne assignments, to Max D. Farmer, East Aurora, N. Y., as trustee Application June 5, 1940, Serial No. 338,968

12 Claims. (Cl. 88—82)

This invention relates to markers for aircraft landing areas. Since night flying of aircraft has become increasingly common, efforts have been directed towards improvements contributing to safe landing of aircraft during conditions of poor visibilty such as may be caused by snow, fog, dust, smoke, and rain, and while decided progress has been made through the use of radio, blind flying instruments, sound, lights, beam landings, and various combinations of these, it is recognized by most authorities that a visual contact system of landing that is workable under all conditions is also highly desirable. Electrically actuated lights have been employed as boundary markers for landing fields and the runways thereof, but they have not been entirely satisfactory because a failure of the source of electrical power makes landing on such a field dangerous, and they offer a hazard to aircraft taking off or landing.

It is well recognized by authorities that the installation of the best possible type of approach and runway lights is a most desirable measure in combination with landing fields equipped for blind, instrument landings.

An object of this invention is to provide an improved type of marker indicating the limits or boundaries of given landing or taking off areas, which may be employed in conjunction with or as an addition to any other types of landing aids, and which will be relatively simple, dependable, easily portable and stored in a compact space, and inexpensive.

Another object of this invention is to provide improved markers for aircraft landing areas which are independent of any commercial source of power, which offer no dangerous obstacles to aircraft taking off or landing, which aid aircraft approaching the landing area or runway in the dark to locate the proper location to descend upon the runway or area, which are effective in guiding aircraft to the landing area or runway from positions at different elevations and at different distances above and in front of the runway or area, and which are equally effective in guiding aircraft in safely taking off from the landing field in the dark.

Another object of the invention is to provide improved boundary markers for aircraft landing areas or runways for night landings and take-offs, which may be easily and quickly placed in position or removed, which offer no dangerous obstacles to aircraft landing or taking off, which are independent of any commercial source of power, which may be used to facilitate the landing and taking off of aircraft equipped with the usual landing lights under absolutely black-out conditions, and which will not interfere with or detract from the efficiency or practicability of existing types of boundary light markers.

Other objects and advantages will be apparent from the following description of a few embodiments of my invention, and the novel features will be particularly pointed out hereinafter in connection with the appended claims.

In the accompanying drawings:

Figure 1 is a diagrammatic plan of a portion of an aircraft take off or landing area, such as the runway of a landing field, employing my improved boundary markers in operative positions therealong and illustrating the manner of use of the same by an aircraft in the act of landing or taking off;

Figure 2 is a diagrammatic perspective, illustrating the uncollapsed position of one of the boundary markers;

Figure 3 is a similar diagrammatic perspective, illustrating one collapsed position of such a marker;

Figure 3A is a plan of the blank from which the latch member is formed;

Figure 3B is a plan of one of the wings that support the frusto-pyramidal shell;

Figure 4 is a plan of a blank representing a step in the manufacture of my improved marker;

Figure 5 is a transverse, sectional elevation through one of these improved markers, the section being taken approximately along the line 5—5 of Figure 1;

Figure 6 is a rear view of one of said markers, showing the interior faces thereof;

Figure 7 is a sectional plan of a portion of the improved marker, the dash lines illustrating different possible positions of adjustment thereof;

Figure 8 is a front face view of a portion or zone of one of the light reflecting elements which are mounted on the collapsible frame or shell;

Figure 9 is a rear face view of the same;

Figure 10 represents a transverse section through the light reflecting element of Figures 8 and 9, the section being taken approximately along the line 10—10 of Figure 9;

Figure 11 represents another transverse section through the same element, but with the section taken approximately along the line 11—11 of Figure 9;

Figure 12 represents a transverse section through a separate reflecting member which may be employed in Figures 8 to 11 in place of the silvered reflecting coating applied directly to the transparent body of the optical element;

Figure 13 is a rear face view of a light reflecting element somewhat similar to Figure 9, but illustrating a slight modification thereof;

Figure 14 is a diagram indicating the light reflecting action of a local zone of the light reflecting element of Figures 8 to 11.

In the embodiment of the invention illustrated in Figures 1 to 11, and 14, an aircraft landing area or field 10 has the side limits of its runway 11 defined or set out by a plurality of improved boundary markers 12, which are disposed at suitable intervals along the side limits of the runway, such as every 100 feet along the length of the runway. These markers are collapsible downwardly to a substantial extent, and each one is formed of a shell 13 having a plurality of oblique side walls with wings 14 articulately connected to and depending from the lower side edges of opposite side walls of the shell. While various shapes may be employed for the shell 13, I have found that a generally frusto-pyramidal shape is particularly effective and highly desirable. The upper surface of the shell 13 forms what may be conveniently called the top base 15, and it is inclined at a small acute angle to the horizontal downwardly toward the front of the shell. The front face 16 of the shell is inclined at a sharper or greater inclination to the horizontal than base 15 and in a direction downwardly and away from the top base of the shell. The side walls 17 of the shell are inclined upwardly towards the top base 15 at a substantial acute angle to the horizontal, these side walls 17 being relatively convergent towards one another upwardly and also towards the front face 16 of the shell.

The wings 14 are preferably hinged in any suitable manner at their upper edges to the lower edges of the side walls 17, so as to depend from those side walls and swing back and forth in a generally horizontal direction and enable collapse of the structure or frame formed of the shell 13 and wings 14. This hinging, in the particular illustrated example, is accomplished by applying ordinary hinges 18 between the wings 14 and side walls 17 and securing said hinges to the wings and walls in any suitable manner such as by spot welding them thereto. The upstanding wings 14 form a collapsible prop or support for the shell 13 that may be considered as the super-structure of the frame or boundary marker.

A latch member 19 is also hinged to the lower edge of the front face 16 of the frusto-pyramidal shell 13, such as by a hinge 20 similar to the hinges 18. This member 19 has a width at its lower edge sufficient to extend beyond the adjacent forward edges of the wings 14 when the wings 14 are in substantially vertical planes. The lower end of the member 19 may be made angular by bending the blank along the dash line in Figure 3A, and is provided in its horizontal arm with a plurality of notches 21, 22, 23, adjacent to each end so that the forward edges of the wings 14 may be engaged in any of the notches 21, 22 or 23, and thus held by those notches at different inclinations to the horizontal. A pair of helical springs 24 are suitably connected together at 25, and at their free ends under tension to the wings 14 so as to yieldingly urge the wings 14 towards one another in a manner to assist the collapse of wings 14 beneath the shell 13. This movement of the wings 14 under the action of springs 24 is normally prevented however, by the engagement of the forward edges of the wings in the notches 21, 22 or 23 of the latch member 19. A third helical spring 26 is connected at one end to the member 19 and at its other end to the connection 25 between the springs 24, so as to yieldingly urge the member 19 against the forward edges of the wings 14 and thus yieldingly prevent disengagement of the wings from the notches of the latch member 19.

From the foregoing it will be observed that the wings and the latch 19 as connected by the springs 24 and 26 provide a yieldable and collapsible support for the shell 13. When sufficient lateral forces are applied to the boundary marker and particularly those in any direction generally lengthwise of the runway or toward the outside of the runway from the interior thereof, the latch member 19 will be disengaged from the wings 14, whereupon the wings will collapse and allow the shell 13 to descend to the ground as shown in Figure 3. If the marker receives an impact directed at the center thereof in a direction toward the boundary, the latch member 19 will be forced to swing outwardly with respect to the shell 13 and wings 14. Then the release of the wings 14 will allow them to collapse and fall towards one side or the other as shown in Figure 3. If the impact is in a direction generally lengthwise of the runway, the wing 14 which is on the side from which the impact is received, will acquire relative movement outwardly along the member 19 toward the free end thereof, so as to be cammed out of the notches 21, 22 and 23, and as it is so cammed, the member 19 is forced forwardly and outwardly so as to release the other wing 14, whereupon that other wing 14 may swing under the shell 13 as shown in Figure 3.

Supported upon the wall portions 15, 16, and 17 of the shell 13 and the wings 14 are light reflecting or catadioptrical elements 27 of generally plate-like form. These elements 27 extend over the largest possible areas of the wall portions to which they are secured by any suitable means such as bolts 28. These elements 27 are highly reflective of light and are of the type formed to reflect light rays incident thereon from a plurality of different angles of incidence, back generally in the direction from which the incident rays strike the element. These elements are preferably made of good light transmitting bodies such as glass or various more or less transparent plastic materials, many of which are on the market and used for this purpose. Inasmuch as aircraft may approach these boundary markers from a plurality of different directions and at different elevations, it is desirable to have a maximum possible area of illumination on the marker visible from each of the possible directions and elevations of approach and therefore these light reflecting elements are preferably of the type which are effective to reflect light back generally towards the source of such light when incident thereon from any of a wide range of angles to the normal to the face of any element.

In Figures 8 to 11, and 14 one form of such element 27 which is particularly effective in devices of this type is illustrated. Each of these improved reflecting elements 27 includes a body 29 of glass, resin plastic or other good light transmitting material. The body is generally plate-like in form and carries upon its front face a plurality of mounds 30 disposed as closely together as possible in parallel rows. Each of these mounds is preferably arcuately convex, and shaped like the end-segment of a sphere so that it acts as an optical lens to refract light rays incident thereon to a focus at the rear of the mound. Smaller but similar mounds 31 are disposed in the spaces between the larger mounds 30 as shown particularly in Figure 8.

The other or rear face of the plate or body 29 may be relatively flat for some purposes, but it is preferably undulatory. In the preferred form the undulations on this rear face are short segments of cylinders 32 arranged at a plurality of different angles to one another, with their longitudinal axes in parallel planes, and which planes are also parallel to the general plane of the front face of the body of plate 29. If these cylindrical segments have the same length as width, they may be alternately arranged in crosswise positions, or if they have lengths approximately twice as long as they are wide, they may be grouped in units of two, side by side, and with segments of each unit or group disposed with their longitudinal axes crosswise of the segments abutting this group, as shown particularly in Figures 9, 10, and 11. If the cylindrical segments are still longer, more of the segments may preferably be included in each group. Other arrangements are also contemplated and will be apparent.

The cylindrical segments are preferably directly opposite the larger mounds 30, with the smaller mounds 31 opposite the junctions between adjacent edges of adjacent cylindrical segments as shown particularly in Figures 10 and 11. A reflecting medium is disposed adjacent the rear face of this plate or body 29, and in Figures 10 and 11 this is shown as a silvered or other reflecting coating directly applied to the body 29. In Figure 12, however, I have shown a polished metal member formed to conform with the undulations of the rear face of the plate 29, and which is confined against that face in any suitable manner such as by resilient or compressible pads.

Figure 14 diagrammatically illustrates the manner in which light is reflected when incident upon an element of the construction shown in Figures 8 to 11 and above described. Incident rays of light, shown diagrammatically as lines 33 and traveling in the directions indicated by the arrows, enter the front face of a mound of the reflecting element 27. Such rays are refracted or bent towards the normal on passing through the face of the mound, and after passing through the body of the element are reflected by the reflecting medium against the rear face of a cylinder 32. The path of the reflected ray is diagrammatically indicated by the lines 34. It will be noted that the reflected ray passes back through the body of the element and is again bent or refracted as it passes through the surface of the mound out into the atmosphere. When this rear reflecting face is located between the focus of the mound and the mound itself, as shown in Figure 14, the reflected rays will travel back approximately in the direction from which they came, but will diverge to an extent depending upon the distance of the focus behind the reflecting face. By varying this distance of the focus behind the reflecting surface, the amount of divergence or spread of the reflected light rays from the incident rays may be varied. This is especially advantageous when the landing light or lights of an approaching aircraft are at a substantial distance from the pilot. Such landing lights are ordinarily located some distance out on the wings, and often above or below the level of the pilot.

Fig. 1 diagrammatically shows how a beam of light from an approaching plane is reflected back to the pilot. The approaching plane P usually has landing lights 35 located a considerable distance from the pilot, on the wings of the aircraft. Rays of light 36 from these landing lights are incident upon various markers 12 along the sides of the runway. Substantial parts of such beams of light are reflected by the markers back along the paths 37 towards the pilot who, in the example shown, is midway of the width of the aircraft. A reflecting element of the preferred type illustrated in Figures 8 to 11 and 14, which will cause the reflected light to be slightly divergent from the incident light, is therefore well adapted for use on markers such as herein described.

Obviously, aircraft may approach such markers at a plurality of different elevations and from various directions. When making blind instrument landings, it is expedient for the aircraft to approach the airport along a glide path which is inclined at an angle of approximately 1 to 2 degrees to the horizontal, but when approaching the airport under ordinary conditions, a steeper glide path might be used. Moreover, the markers should also be visible to any pilot in an aircraft passing over the field who is attempting to find the location of the landing runway. The markers should, therefore, have surfaces facing substantially in an upward direction and at a plurality of different angles with respect to the horizontal in order to render it equally visible in such directions.

Accordingly, in a preferred form of the invention the lower wings 14 may be inclined at an angle approximately in the range of from 1 to 40 degrees with respect to the vertical; the side walls 17 of the marker may be generally inclined at an angle in the range of approximately 30 to 50 degrees with respect to the horizontal; the top base 15 of the shell may be inclined downwardly toward the runway at an angle approximately in the range of from 2 to 20 degrees with respect to the horizontal; the front face 16 of the shell may preferably be inclined at an angle approximately in the range of from 20 to 50 degrees with respect to the vertical; and the exterior angle between the line of intersection of the planes of the wings 14 with the ground and a line parallel to the length of the runway passing through the front lower corner of the wings 14 may be approximately in the range of 45 to 80 degrees. A marker so constructed has reflecting elements facing in a plurality of different directions, making the marker readily visible from a plurality of positions and elevations to any aircraft approaching the runway or the landing field bounded by such markers. From the description of the member 19 and the engagement of the notches 21, 22 and 23, with the edges of the wings 14 it will be apparent that the wings 14 may be adjustably inclined in different positions with respect to the horizontal to accommodate aircraft approaching along various glide paths. When set for blind, instrument landings, the wings 14 might be set at an inclination of approximately 1 or 2 degrees with respect to the vertical, as a 1 or 2 degree glide path is desirable with blind, instrument landings. Under other conditions, however, such as an ordinary night landing, the approaching aircraft would probably descend at a much more rapid rate along a steeper glide path, and for such purpose the side wings 14 could advantageously be adjusted by swinging them so as to face upwardly at greater angles.

Figure 4 illustrates one method of manufacturing the shell 13. The outlines of the shell 13 may be stamped from a flat piece or blank A of sheet metal in the shape shown by the marginal solid lines of Figure 4, the piece A being also cut through or sheared along the interior solid lines B of that figure. The blank is then folded along the dash lines 38, 39 and 40 (Figure 4) and the triangular zones C disposed beneath the zone D, and suitably secured such as by spot welding or riveting to the zone D forming the front face 16 of the shell. The structure thus formed is relatively rigid, strong and inexpensive.

In Figure 13, a modification of the reflecting elements is illustrated diagrammatically. In this form, the cylindrical segments 32a, which correspond generally to the segments 32 of Figures 8 to 11, forming the rear surface are separated from one another by narrow, relatively flat spaces or areas 32b so as to avoid the relatively sharp edges between abutting segments 32 in Figures 8 to 11. These spaces 32b may be obtained easily for example, by employing cylindrical segments having shorter radii of curvature, and the mounds 30 and 31 on the opposite face may be the same as for the corresponding face in Figures 8 to 11. The surfaces 32a and 32b are provided with a reflecting medium such as a silvered coating, or a polished metal reflector of the type shown in Figure 12.

The material of which the frame or structure of the marker is made, may be of any selected kind. The shell 13 and the wings 14 may be formed of resinous plastics, molded rubber, wood, sheet metal, or of any other materials which are strong enough to suitably support the reflecting elements in the positions indicated. The reflecting element itself may also be the supporting structure. Inasmuch as there may be a demand for such markers in proximity to bodies of salt water, a non-corrosive material may be employed, or other material may be employed and coated with suitable enamels or paints which protect the material from disintegration due to atmospheric conditions. I have found that stainless steel is particularly effective as a material of which to make the shell 13, the wings 14, the latch member 19 and the hinges 18, because it has great strength and rigidity and is relatively unaffected by the atmosphere in the vicinity of salt water, or, for instance, where fumes in the air might otherwise have a destructive action on the material.

The manner of use of this improved boundary marker on a landing field is believed to be apparent from the foregoing description, but will be very briefly commented upon. Assuming that the improved boundary markers 12 are disposed in rows along the sides of a runway 11 of the landing field or area 10, these markers should be disposed with their faces 16 facing towards the center of the runway 11 as shown clearly in Figure 1. Let it be assumed that at night, an aircraft, such as P in Figure 1, is flying over the landing field in an effort to locate the landing runway 11 for the purpose of making a landing. The pilot of the craft turns on his landing lights 35 and points them downwardly beneath his plane. As the light rays from the landing lights go down, some of them will strike the slightly inclined top face or base 15 of one or more of the markers, and be reflected back generally towards their source, some reaching the pilot and making the markers clearly visible by this reflected light. As the aircraft moves along it will illuminate more and more of these markers and thus indicate to the pilot the relative positions of the side limits of the runway, so that the pilot can then navigate his craft to a position at one end of the landing runway.

By turning the landing lights forwardly and downwardly the rays therefrom will illuminate a plurality of the markers as shown by the rays 36 in Figure 1, such rays striking the inclined side faces 17 of the shell 13 and being reflected back so as to reach the pilot, thus enabling him to determine the side limits of the runway immediately in front of him. As the pilot starts to descend in approaching one end of the runway in this manner, a number of the markers in each row on each side of the runway will be visible to the pilot by reflected light from the reflecting elements on sides 17 of those markers, over quite a wide variety of angles of incidence of the light rays on the markers. As the aircraft continues to descend, the light from the landing lights will also be incident on the reflecting elements carried by the wings 14 which have greater inclinations to the horizontal than sides 17, so that the markers will remain visible even when close to the ground. As the craft travels along the runway, it will successively illuminate the markers immediately in advance thereof, which will continue to indicate to the pilot the side limits of the runway.

Similarly, in taking off, the landing lights on the aircraft P will illuminate the reflecting elements on the wings 14 facing the aircraft of a number of markers on each side of the runway, and which may be the opposite sides of the markers from those which were illuminated from the landing lights when the aircraft was making a landing. These markers indicate the limits of the runway as the craft is traveling along the runway and gaining speed sufficient to enable the aircraft to rise. The inclined faces 16 are of use to a pilot while moving above the runway in an effort to locate the landing field or runway, and the reflected light from those faces 16 will also indicate the direction of the runway in a direction crosswise thereof. If the aircraft, due to cross winds or miscalculations on the part of the pilot, should happen to strike one or more of these markers, the latter will be partially collapsed, as shown in Figure 3, and the height of the shell 13 is then insufficient to cause any great damage to the aircraft for the reason that the impact of the landing gear of an aircraft, in striking an obstruction having no greater height than that of the shell 13, will not cause a tipping over of the craft or injury thereto. Thus, by the use of a somewhat collapsible marker, one can obtain the necessary height and reflecting area for the marker without endangering an aircraft that may through inadvertence or accident strike it.

These markers are particularly useful in defining emergency landing and "take-off" fields or runways, especially in military zones where "black-outs" are necessary for military reasons. They are also useful as emergency or regular landing markers for commercial airports, for in the event of failure of commercial sources of power that normally serve lights defining the limits of the landing field or runway, a pilot may nevertheless with safety make a landing or take-off, merely by using his own landing lights. The markers may also be arranged on an emergency field to define a runway laid out with due regard for the direction of wind blowing at any time.

It will be noted that in the illustrated embodiments of the reflecting elements, the cylindrical segments on the rear face of the light transmitting body are arranged with their longitudinal axes running in a plurality of different directions, which in these examples are at right angles to one another. These reflecting elements are preferably mounted on their supporting, somewhat collapsible structure, with the longitudinal axes of one set or group of cylindrical segments extending approximately horizontally, and the other set either upstanding or extending approximately vertically. The cylindrical segment gives a wide range of angles of incidence of light rays in which the light will be reflected back in the same general direction as the source with considerable intensity, and by having the axes of the cylindrical segments of one set or group upstanding and the other horizontal, the upstanding segments will give a wide range of angular visibility to a pilot as his craft moves in a direction generally crosswise of the upstanding segments, and the horizontal segments will give a wide range of angular visibility to the pilot as his craft descends towards or ascends from the runway or landing area. The small mounds between the large mounds aid in preventing glare that is caused by flat areas between the mounds.

Such reflecting markers can also be used by firemen, police, and drivers of buses, trucks, motor transports and other vehicles as a substitute for or addition to flares now required by law in many localities, or to indicate dangerous driving zones. Such markers can also be mounted on floats and anchored in desired positions to indicate the limits of a safe landing area on bodies of water; or to indicate hazards to landing aircraft such as piers or other obstructions. Such markers are also useful in indicating to a pilot descending to a landing area, the location of the ground, that is the distance from the pilot to the ground, so that he can level out at the proper time and not hit the ground with too much downward force. Such a marker is easily visible from distances of 500 feet and more depending on the intensity of the landing lights.

The term "runway" is intended to refer not only to specially prepared roads upon which aircraft may travel in landing or taking off, but also broadly to any selected area of land or water in which an aircraft may land or take off.

While helical springs 24 and 26 are shown to hold the latch 19 and wings 14 in interengagement, it will be understood that other elastic means and even other merely yieldable or easily breakable connecting elements will serve this same purpose.

It will be understood that various changes in the details, materials and arrangements of parts which have been herein described and illustrated in order to explain the nature of the invention, may be made by those skilled in the art within the principle and scope of the invention as explained in the appended claims.

I claim as my invention:

1. In an aircraft landing station, an improved light-reflecting optical device for use in indicating the limits of a takeoff and landing area, comprising a frame formed of sections articulately connected together and forming an upstanding structure but freely movable relatively to one another in a direction to collapse the frame, to a substantial extent, as to the height it occupies, means yieldingly urging said sections oppositely to said direction into relative positions to form said upstanding structure but yielding by pressure to collapse the frame so as to be freely and downwardly collapsible in height to a substantial extent when struck by any part of an aircraft traveling upon said area, and said frame having thereon, a plurality of exteriorly exposed, light reflecting, generally flat, catadioptrical optical elements facing, before collapse of said frame, upwardly and in the same general horizontal direction to different extents and at a plurality of different inclinations to the horizontal, and each of said elements being formed to slightly spread rays incident thereon and at relatively wide angles with the normal to the reflecting face, and reflect them backward in the same general direction from which they approached, whereby an aircraft approaching said area from adjacent a margin thereof, and turning its landing lights upon the area will receive from said signal device, reflected rays from its landing lights at a plurality of different elevations and while in different positions along said area.

2. A light reflecting signal device for defining the boundaries of aircraft landing areas which comprises an approximately frusto-pyramidal form whose upper face makes a small inclination to the horizontal and whose side faces have larger inclinations to the horizontal than said top face, wings articulately connected to and depending from the lower edges of the side faces, swingable in generally horizontal directions and forming a collapsible support for said frusto-pyramidal shell, means yieldingly holding said wings in upstanding supporting positions, and preventing said relative swinging of said wings and light reflecting elements exteriorly exposed on said upper and side faces and said wings.

3. A light-reflecting boundary marker for use in indicating a reference zone for an aircraft takeoff and landing zone comprising a mound-like, somewhat frusto-pyramidal shell having a top base, two opposite upstanding side walls converging towards one another generally crosswise of a common direction, and a front wall spacing said side walls at their nearest upstanding edges, said front wall being inclined at an acute angle to the vertical, wings hingedly connected to the lower edges of said side walls and when upstanding forming props for supporting said shell above the ground, said wings also converging towards one another crosswise of said direction when upstanding, the planes of said wings intersecting the plane of the ground at an acute angle thereto, means for yieldingly holding said wings in upstanding positions in which they make acute dihedral angles to the horizontal and operable when the marker receives an impact from a vehicle traveling said zone, to release said wings for collapse and allow descent of said shell, and exteriorly exposed light reflecting optical means on said wings and walls, of a type which reflects a substantial amount of light incident thereon, from a wide variety of angles to a normal to the face, back towards approximately the source of said light.

4. An improved light-reflecting boundary marker for use in indicating a marginal limit of a landing and takeoff area, and comprising a mound-like, somewhat frusto-pyramidal shell having a top base, two opposite upstanding side walls disposed generally transversely of a common direction and converging towards one another approximately crosswise of said direction, a front wall between the upstanding edges of the converging ends of said side walls, wings hingedly connected to the lower edges of said side walls and forming supports for said shell, said wings converging towards one another in the same direction as said side walls converge, and means for yieldingly holding said wings in upstanding positions in which they support said shell at a substantial distance above the ground and operable when the marker receives an impact from a traveling aircraft to release said wings and allow descent of such shell.

5. An improved light-reflecting boundary marker for use in indicating a limit of a landing and takeoff zone, comprising a somewhat mound-like frusto-pyramidal shell, said shell having a top base, a pair of side walls depending from opposite side edges of said top base and converging generally in one direction, a front wall depending from the lower edge of said top base and connected to the upstanding edges of the ends of said side walls, a pair of wings, hinged to the lower edges of said side walls and operable when upstanding to support said shell above the ground, said wings also being so disposed that a normal to the exterior of the surface of each of them will extend generally in said direction away from said marker, said side walls being downwardly inclined from the top base at an angle in the range of approximately 30 to 50 degrees with respect to the horizontal, and said supporting wings being downwardly inclined from said side walls at an angle in the range of approximately 70 to 89 degrees with respect to the horizontal, exteriorly exposed light reflecting optical means on the faces of said wings and walls for increasing the visibility of said markers to the pilot of an aircraft attempting to locate said limit.

6. An improved light-reflecting boundary marker for use in indicating a limit of a landing and takeoff zone, comprising a somewhat mound-like, frusto-pyramidal shell having a top base, a pair of side walls depending from opposite side edges of said top base and converging generally in one direction, a front wall depending from the lower edge of said top base and connected to the upstanding edges of the ends of said side walls, a pair of wings, hinged to the lower edges of said side walls and operable when upstanding to support said shell above the ground, said wings also being so disposed that a normal to the exterior of the surface of each of them will extend generally in said one direction away from said marker, said side walls being downwardly inclined from the top base at an angle in the range of approximately 30 to 50 degrees with respect to the horizontal, and said supporting wings being downwardly inclined from said side walls at an angle in the range of approximately 70 to 89 degrees with respect to the horizontal, said base, walls and wings carrying optical reflecting elements formed to reflect a substantial amount of light incident thereon from a wide variety of angles to a normal to the exterior faces of any of said devices, back towards approximately the source of said incident light.

7. An improved light reflecting, boundary marker for use in indicating the marginal limit of a landing and take-off zone, comprising a mound-like frame having generally flat areas on its faces, the bottom portion of said frame being formed of generally flat sections connected to the top portion of said frame for movement inwardly and outwardly away from the base of the frame to allow the top portion to settle upon the supporting surface, means for releasably holding said flat sections in upstanding positions and supporting said top portion well above said supporting surface and releasing said sections upon sufficient external pressure on said frame in a downward or horizontal direction, the top and side walls of said frame carrying exteriorly exposed, catadioptrical elements with generally flat areas of substantial size for reflecting light rays incident thereon, back generally towards their source, whereby an observer in an approaching aircraft may readily distinguish said marker when illuminated by light from adjacent said observer.

8. A reflecting unit for indicating the position of a landing field or the like which comprises a mound-like shell formed to be easily and substantially collapsible upon the application of appreciable exterior forces, said shell having a top wall portion, upper side wall portions outwardly and downwardly divergent from edges of said top wall portion, and lower side wall portions depending from lower edges of said upper side wall portions, all of said wall portions having exteriorly exposed, generally flat, light reflecting means each formed to reflect a substantial amount of light incident thereon from any one of a wide variety of angles approximately back towards the source of said light, said lower side wall portions having greater inclinations to the horizontal than said upper side wall portions, and all of said side wall portions converging in a common direction generally horizontally to one side of said unit, said lower side wall portions being yieldingly held in upstanding positions to provide a collapsible support for the rest of said shell.

9. A reflecting boundary marker for indicating the position of an aircraft landing area which comprises a mound-like downwardly collapsible structure formed of a plurality of connected parts having approximately flat, rigid side wall portions articulated to one another in a manner to permit of downward collapse of said structure, means for yieldingly holding the parts of said structure together in a normal upstanding, uncollapsed position, said wall portions having exteriorly exposed, highly reflecting surfaces for light rays, each of said surfaces being formed to reflect a substantial amount of light incident thereon from any one of a plurality of different angles and directions generally back towards the source of said light, all of said wall portions being convergent in a common direction generally horizontally to one side of said structure, part of said wall portions facing somewhat in one direction generally crosswise of said common direction, and other wall portions facing in the other direction generally crosswise of said common direction, the lower parts of said side wall portions making greater inclinations to the horizontal than the upper parts of said side wall portions.

10. An improved, reflecting marker for an aircraft runway, which comprises a mound-like form normally high enough to cause serious danger of injury to an aircraft if struck by a wheel of said craft, and having its bottom portion formed of sections hinged at their upper edges to the lower edges of the upper portion and swingable from upstanding positions supporting said upper portion to horizontal positions that allow said upper portion to rest on the runway, means normally holding the hinged sections upstanding, but releasable upon the application of external face pressure to said form to permit said sections to collapse and lower said upper portion to a lower height insufficient to cause serious danger of injury to said aircraft if said form is struck by a wheel of said craft, said form having a plurality of upwardly and laterally facing, non-parallel surfaces of substantial area, the major portions of which are covered by exteriorly exposed, catadioptrical devices which reflect light rays incident thereon back generally in the same direction from which they came.

11. An improved light reflecting marker for an aircraft landing and take-off runway, which comprises a mound-like form having a plurality of face areas of substantial size facing in different directions and at different inclinations to the support on which said form is resting, said areas being approximately covered by exteriorly exposed, catadioptrical elements which direct light rays incident thereon from a plurality of angles, back generally in the direction from which they came, said form being of a height to form a dangerous hazard to an aircraft, a wheel of which may strike it, as the craft is moving along the runway, said form having its lower portion formed of individual sections hingedly connected to the upper portion, means normally holding the hinged sections upstanding, but releasable upon the application of external face pressure to said form to permit said hinged sections to collapse and lower said upper portion to a lower height which offers no serious damage to an aircraft which may strike it.

12. An improved light reflecting marker for an aircraft landing and take-off runway, which comprises a mound-like form having a plurality of face areas of substantial size facing in different directions and at different inclinations to the support on which said form is resting, said areas being approximately covered by exteriorly exposed, catadioptrical elements which direct light rays incident thereon from a plurality of angles, back generally in the direction from which they came, said form having a top structure, wings articulately connected to and depending from said structure, and means yieldingly holding said wings in upright positions to support said structure, but yieldable freely under external face pressure to collapse downwardly until the effective height is only approximately that of said structure.

EUGENE D. WATERS.